United States Patent [19]

Heck

[11] Patent Number: 5,434,739

[45] Date of Patent: Jul. 18, 1995

[54] REVERSE BATTERY PROTECTION CIRCUIT

[75] Inventor: Karl R. Heck, Phoenix, Ariz.

[73] Assignee: Motorola, Inc., Schaumburg, Ill.

[21] Appl. No.: 75,839

[22] Filed: Jun. 14, 1993

[51] Int. Cl.$^6$ .............................................. H02H 3/18
[52] U.S. Cl. ......................................... 361/84; 361/56
[58] Field of Search ...................... 361/84, 85, 92, 90, 361/56, 91, 77

[56] References Cited

U.S. PATENT DOCUMENTS 5,126,911  6/1992  Contiero et al. ...................... 361/84

*Primary Examiner*—Marc S. Hoff
*Assistant Examiner*—S. Jackson
*Attorney, Agent, or Firm*—Rennie William Dover

[57] ABSTRACT

A protection circuit (10) for protecting internal circuitry of an integrated circuit (26) from a reverse battery connection has been provided. The protection circuit includes a pass transistor (14) which is rendered operative when the supply voltage is properly connected to the integrated circuit. However, when the power supply is improperly connected, a second transistor (32) becomes active thereby rendering the pass transistor inactive and not allowing the reverse supply voltage to be applied to the internal circuitry.

8 Claims, 1 Drawing Sheet

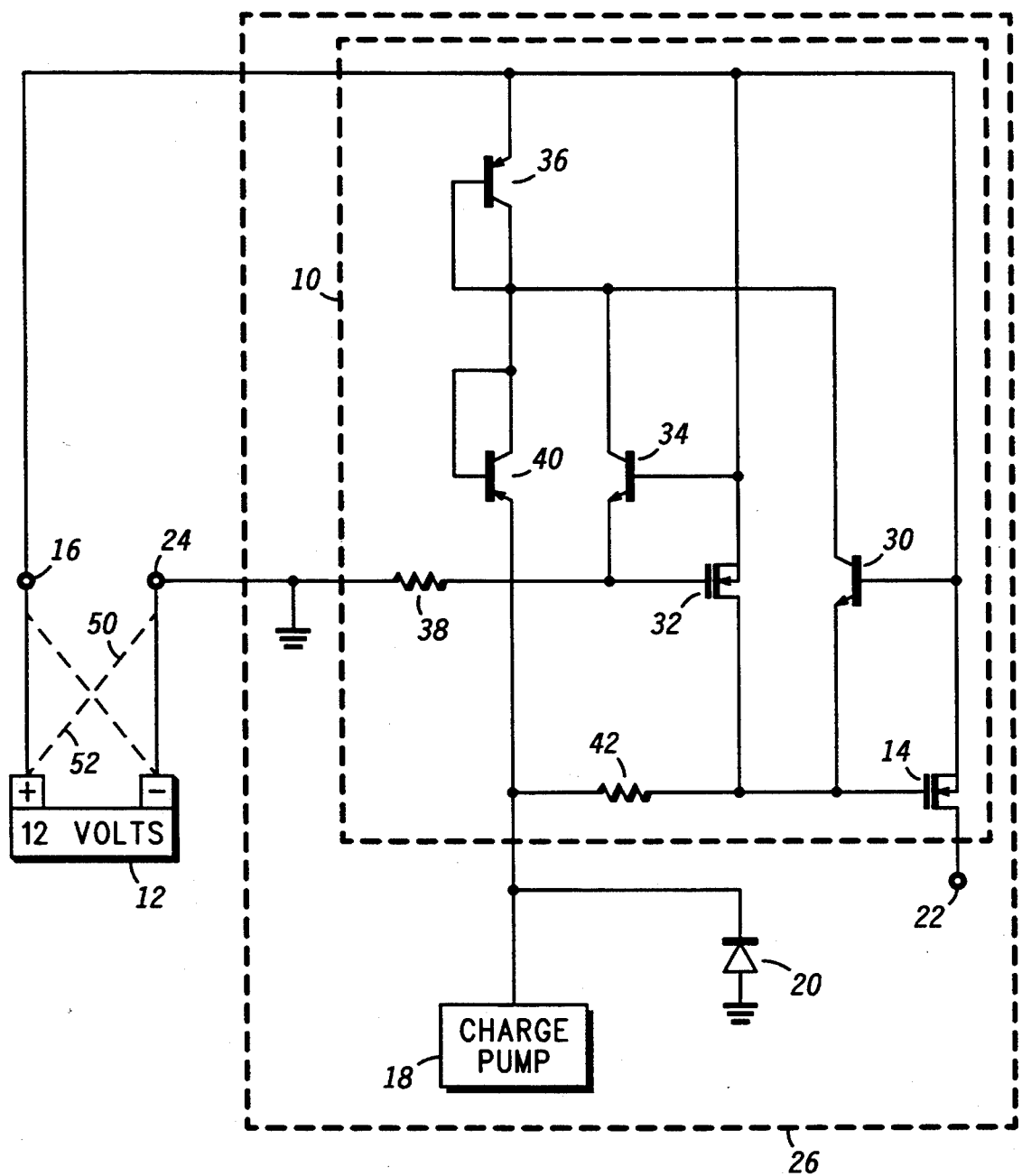

REVERSE BATTERY PROTECTION CIRCUIT

FIELD OF THE INVENTION

This invention relates to protection circuits and, in particular but not limited to, a reverse battery protection circuit for use in automotive applications.

BACKGROUND OF THE INVENTION

There currently exists a numerous types of electronic integrated circuits (IC's) for use in the automotive industry. Generally, the power supply for these circuits are generated from a 12-volt battery in an automobile. However, automotive IC's tied to the battery must survive the battery being hooked up backwards, for example, to avoid forward biasing epitaxial layers of the IC that are tied to the battery which thereby could result in destruction of the IC.

One attempt that prior art has made for providing reverse battery protection for IC's is to include a series diode between the battery and the integrated circuit wherein if the integrated circuit is connected to the battery backwards, the series diode is reversed biased and prevents supply voltage from being applied to the integrated circuit. However, the series diode solution compromises low voltage performance and the geometry of the diode becomes larger as supply current requirements increase.

Another attempt that prior art has made in providing reverse battery protection for an integrated circuit is to provide a saturated lateral PNP transistor in series between the battery and the integrated circuit. Although low voltage performance is not compromised in this solution, base current requirements for the lateral PNP increase power dissipation and the geometry of the PNP transistor becomes large as supply current requirements increase.

Another attempt that prior art has made in providing reverse battery protection for an integrated circuit is to provide a charged pumped reverse TMOS transistor as a pass device between the battery and the integrated circuit wherein the TMOS transistor has passive (resistive) gate to source termination. However, this solution requires DC current from the charge pump to enhance the TMOS transistor, and the turn off time of the TMOS transistor is limited by the size of the passive gate termination. Moreover, the charge pump must be high impedance when the supply voltage is reversed.

Hence, there exists a need for an improved reverse battery protection circuit for an integrated circuit that does not compromise low voltage performance, can efficiently handle moderate supply currents, does not demand DC current from a charge pump, and has a fast turn off time.

BRIEF DESCRIPTION OF THE DRAWING

The sole figure illustrates a detailed schematic diagram of a reverse battery protection circuit for protecting an integrated circuit in accordance with the present invention.

DETAILED DESCRIPTION OF THE DRAWING

Referring to the sole figure, there is illustrated reverse battery protection circuit 10 fabricated within integrated circuit (IC) 26 and being coupled between battery 12 and terminal 22. It is understood that terminal 22 is further coupled to additional circuitry wherein this additional circuitry is desired to be protected from reverse battery hook up. IC 26 includes protection circuit 10 as well as charge pump 18, and any additional circuitry (not shown) coupled to terminal 22. Terminal 24 is coupled to a ground reference of IC 26.

Protection circuit 10 includes pass transistor 14 having a source electrode coupled to terminal 16 while the gate electrode of transistor 14 is coupled through resistor 42 to charge pump 18. The back gate of transistor 14 is coupled to the source electrode of transistor 14 while the drain electrode of transistor 14 is coupled to terminal 22.

Protection circuit 10 further includes transistor/zener diode 30 having a base coupled to terminal 16 and an emitter coupled to the gate electrode of transistor 14 and to the drain electrode of transistor 32. The collector of transistor 30 is coupled to the collectors of transistor/zener diode 34 and transistor/diode 36 wherein the collector of transistor 36 is coupled to its base. The emitter of transistor 36 and the base of transistor 34 are both coupled to terminal 16.

Moreover, the source electrode of transistor 32 and the back gate electrode of transistor 32 are coupled to terminal 16. The emitter of transistor 34 is coupled to the gate electrode of transistor 32 and returned to ground through resistor 38. The collector of transistor 34 is coupled to the collector of transistor/diode 40 wherein transistor 40 has its base coupled to its collector. The emitter of transistor 40 is coupled through resistor 42 to the gate electrode of transistor 14. Moreover, the emitter of transistor 40 is coupled to charge pump 18.

Charge pump 18 is coupled through diode 20 and returned to ground reference. In normal operation, transistor 14 requires the use of charge pump 18 to generate a voltage of at least 5 volts above a voltage supplied by battery 12. Moreover, charge pump 18 is typically available on IC 26 since it is required for other applications.

Under proper connection, the positive terminal of battery 12 is coupled to terminal 16 while the negative terminal of battery 12 is coupled to terminal 24. As a result, a positive supply voltage is applied to the source electrodes of transistors 32 and 14 as is desired. In this situation, transistor 14 is rendered operative while transistor 32 is rendered non-operative. As a result, the voltage appearing at terminal 22 (with respect to ground reference) will be substantially equal to the voltage appearing at terminal 16 (with respect to ground reference) less any IR drop occurring across transistor 14.

However, if battery 12 is improperly hooked up in a reverse manner wherein the positive terminal of battery 12 is coupled to terminal 24 while the negative terminal of battery 12 is coupled to terminal 16 as represented by dotted lines 50 and 52. This now means that a negative voltage (with respect to ground reference) is applied to the source electrodes of transistors 14 and 32 as is not desired. Under this condition, transistor 32 is rendered operative thereby shorting the gate electrode of transistor 14 to its source electrode and, thus, rendering transistor 14 non-operative. As a result, the voltage appearing at terminal 16 is not passed to terminal 22 and thus is not supplied to any additional internal IC circuitry. Further, any epitaxial layers typically coupled to terminal 22 cannot conduct current and damage integrated circuit 26.

Transistor 30 functions as a zener diode to protect excessive voltage from appearing on the gate electrode of transistor 14. Essentially, the base of transistor 30 is the anode of the zener diode while the emitter of transistor 30 is the cathode of the zener diode. Moreover, the collector of transistor 30 is the third terminal of the zener diode and is coupled to the collector of transistor 34 which is the epitaxial island. Similarly, transistor 34 functions as a zener diode to protect excessive voltage from appearing on the gate electrode of transistor 32 wherein the base and emitters of transistor 34 respectively act as the anode and cathode of the zener diode while the collector of transistor 34 is coupled to the epitaxial island.

Moreover, resistor 38 functions to provide charge to render transistor 32 operative under a reverse battery condition. Also, resistor 42 functions to decouple the gate electrode of transistor 14 from charge pump 18.

It should be noted that components 30, 34, 32 and 38 are all fabricated in one epitaxial region which is biased by PNP transistors 36 and 40.

The present invention assures that no epitaxial islands are tied to terminal 16. As a result, if the connections of battery 12 are reversed, there are not epitaxial islands to be forward biased.

The present invention has several advantages. First, protection circuit 10 does not provide any additional DC loading on charge pump 18 when it is desired to enhance and turn on TMOS transistor 14. Second, under reverse battery conditions, charge pump 18 does not have to be heavily resistive or open for proper operation as is the case for prior art circuits. Thus, charge pump 18 does not have any special design requirements. Third, protection circuit 10 provides reverse battery protection without sacrificing power supply head room for low voltage operation since no series diodes are used. Moreover, the present invention quickly renders transistor 14 non-operative under a reverse battery condition. In particular, the discharge time constant for the gate electrode of transistor 14 is a product of the drain-source on resistance ($R_{DSON}$) of transistor 32 and the input capacitance ($C_{ISS}$) of transistor 14 which is substantially less than the turn off time for a passive gate termination scheme.

By now it should be apparent from the foregoing discussion that a novel protection circuit for protecting internal circuitry of an integrated circuit from a reverse battery connection has been provided. The protection circuit includes a pass transistor which is rendered operative when the supply voltage is properly connected to the integrated circuit. However, when the power supply is improperly connected, a second transistor becomes active thereby rendering the pass transistor inactive and not allowing the reverse supply voltage to be applied to the internal circuitry.

While the invention has been described in specific embodiments thereof, it is evident that many alterations, modifications and variations will be apparent to those skilled in the art. Further, it is intended to embrace all such alterations, modifications and variations in the appended claims.

I claim:

1. An integrated circuit having reverse battery protection, the integrated circuit including a charge pump and internal circuitry, the integrated circuit also including a protection circuit coupled between a first and second terminals wherein the first terminal is coupled to a battery and the second terminal is coupled to the internal circuitry, the protection circuit comprising:

a pass transistor having first and second current carrying electrodes and a control electrode, said first and second current carrying electrodes of said pass transistor respectively coupled between the first and second terminals, said control electrode of said pass transistor coupled to the charge pump;

a first transistor (32) having first and second current carrying electrodes and a control electrode, said first current carrying electrode of said first transistor coupled to said control electrode of said pass transistor, said second current carrying electrode of said first transistor coupled to the first terminal;

a second transistor (30) having a collector, a base and an emitter, said base of said second transistor being coupled to the first terminal, said emitter of said second transistor coupled to said first current carrying electrode of said first transistor;

a third transistor (34) having a collector, a base and an emitter, said base of said third transistor coupled to the first terminal, said emitter of said third transistor coupled to said control electrode of said first transistor, said collector of said third transistor coupled to said collector of said second transistor;

a fourth transistor (40) having a collector, a base and an emitter, said collector of said fourth transistor coupled to said collector of said third transistor, said base of said fourth transistor coupled to said collector of said fourth transistor, said emitter of said fourth transistor coupled to said control electrode of said pass transistor;

a fifth transistor (36) having a collector, a base and an emitter, said collector of said fifth transistor coupled to said collector of said fourth transistor, said base of said fifth transistor coupled to said collector of said fifth transistor, said emitter of said fifth transistor coupled to the first terminal; and a first resistor (38) coupled between said control electrode of said first transistor and a first supply voltage terminal.

2. The protection circuit according to claim 1 further including a second resistor (42) coupled between said emitter of said fourth transistor and said control electrode of said pass transistor.

3. A circuit for protecting internal circuitry of an integrated circuit from reverse battery connection, the integrated circuit including a charge pump and having first and second terminals coupled to a battery for supplying power to the integrated circuit, the circuit comprising:

first means for passing a voltage appearing across the first and second terminals to the internal circuitry when the integrated circuit is properly connected to the battery, said first means coupled between the first terminal and the integrated circuit and coupled to the charge pump;

second means for rendering said first means non-operative when the integrated circuit is improperly connected to the battery thereby blocking said voltage appearing across said first and second terminals from being passed to the internal circuitry, said second means including a first transistor which is rendered operative when the integrated circuit is improperly connected to the battery, said second means coupled between the first terminal and said first means.

4. The circuit according to claim 3 wherein said second means includes:

said first transistor (32) having first and second current carrying electrodes and a control electrode, said first current carrying electrode of said first transistor coupled to said first means, said second current carrying electrode of said first transistor coupled to the first terminal;

a second transistor (30) having a collector, a base and an emitter, said base of said second transistor coupled to the first terminal, said emitter of said second transistor coupled to said first current carrying electrode of said first transistor;

a third transistor (34) having a collector, a base and an emitter, said base of said third transistor coupled to the first terminal, said emitter of said third transistor coupled to said control electrode of said first transistor, said collector of said third transistor coupled to said collector of said second transistor;

a fourth transistor (40) having a collector, a base and an emitter, said collector of said fourth transistor coupled to said collector of said third transistor, said base of said fourth transistor coupled to said collector of said fourth transistor;

a fifth transistor (36) having a collector, a base and an emitter, said collector of said fifth transistor coupled to said collector of said fourth transistor, said base of said fifth transistor coupled to said collector of said fifth transistor, said emitter of said fifth transistor coupled to the first terminal;

a first resistor (38) coupled between said control electrode of said first transistor and a first supply voltage terminal; and a second resistor (42) coupled between said emitter of said fourth transistor and said first means.

5. The circuit according to claim 3 wherein said second means includes:

a first transistor (32) having first and second current carrying electrodes and a control electrode, said first current carrying electrode of said first transistor coupled to said first means, said second current carrying electrode of said first transistor coupled to the first terminal;

first zener diode means (30) coupled across said second and control electrodes of said first transistor for limiting a voltage appearing thereacross; and bias means coupled between the first terminal and said first means for biasing an epitaxial region in which said first transistor and said first zener diode means are fabricated.

6. The circuit according to claim 5 wherein said second means further includes second zener diode means (34) coupled across said first means for limiting a voltage appearing thereacross, said second zener diode means also being fabricated in said epitaxial region.

7. A method for providing reverse battery protection to internal circuitry of an integrated circuit, the integrated circuit having first and second terminals for coupling to a battery, the method comprising the steps of:

allowing a voltage appearing at the first terminal to pass through a transistor to the internal circuitry when the integrated circuit is properly coupled to the battery; and actively disabling said transistor when the integrated circuit is improperly coupled to the battery thereby preventing said voltage appearing at the first terminal to pass to the internal circuitry.

8. An integrated circuit having reverse battery protection, the integrated circuit including a charge pump and internal circuitry, the integrated circuit also including a protection circuit coupled between first and second terminals wherein the first terminal is coupled to a battery and the second terminal is coupled to the internal circuitry, the protection circuit comprising:

a pass transistor having first and second current carrying electrodes and a control electrode, said first and second current carrying electrodes of said pass transistor respectively coupled between the first and second terminals, said control electrode of said pass transistor coupled to the charge pump; and a first transistor for actively disabling said pass transistor when the battery is improperly connected thereby preventing a voltage appearing on the first terminal from appearing at the second terminal, said first transistor having first and second current carrying electrodes and a control electrode, said first current carrying electrode of said first transistor coupled to said control electrode of said pass transistor, said second current carrying electrode of said first transistor coupled to said first current carrying electrode of said pass transistor, said control electrode of said first transistor coupled to ground reference.

* * * * *